US009746885B2

(12) United States Patent
Delpier et al.

(10) Patent No.: US 9,746,885 B2
(45) Date of Patent: Aug. 29, 2017

(54) COMPUTING SYSTEM INCLUDING A FIRST AND SECOND HOUSING AND POLAR MAGNETS

(75) Inventors: Michael Delpier, Houston, TX (US); Stacy L Wolff, Cypress, TX (US); Kevin L Massaro, Houston, TX (US); Daniel Koelker, Palo Alto, CA (US); Steven Jacobs, Pleasanton, CA (US); Dimitre Mehandjiysky, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 75 days.

(21) Appl. No.: 14/355,030

(22) PCT Filed: Feb. 27, 2012

(86) PCT No.: PCT/US2012/026714
§ 371 (c)(1),
(2), (4) Date: Apr. 29, 2014

(87) PCT Pub. No.: WO2013/085556
PCT Pub. Date: Jun. 13, 2013

(65) Prior Publication Data
US 2014/0313665 A1    Oct. 23, 2014

Related U.S. Application Data

(60) Provisional application No. 61/566,841, filed on Dec. 5, 2011.

(51) Int. Cl.
*G06F 1/16*    (2006.01)

(52) U.S. Cl.
CPC .......... *G06F 1/1681* (2013.01); *G06F 1/1616* (2013.01); *G06F 1/1654* (2013.01); (Continued)

(58) Field of Classification Search
CPC .... G06F 1/1616; G06F 1/1654; G06F 1/1669; G06F 1/1679
See application file for complete search history.

(56) References Cited

U.S. PATENT DOCUMENTS 6,366,440 B1 *   4/2002   Kung ................... E05C 19/16
                                                361/147
6,512,670 B1 *   1/2003   Boehme ............... G06F 1/1616
                                                312/223.2
(Continued)

FOREIGN PATENT DOCUMENTS

CN       1996201 A        7/2007
CN     101959379 A        1/2011
(Continued)

OTHER PUBLICATIONS

PCT Search Report and Written Opinion ~ Application No. PCT/US2012/026714 ~ Feb. 28, 2013, 12 pages.

*Primary Examiner* — Zachary M Pape
*Assistant Examiner* — Douglas Burtner
(74) *Attorney, Agent, or Firm* — HP Patent Department

(57) ABSTRACT

A first housing with a polar magnet on a first side. The first housing can include an opening on the first side. A second housing can include a sliding latch. An opposite polar magnet attached to the sliding latch. The polar magnet attracts the opposite polar magnet on the sliding latch to move the sliding latch to a latched position.

20 Claims, 5 Drawing Sheets

(52) U.S. Cl.
CPC .......... *G06F 1/1669* (2013.01); *G06F 1/1679* (2013.01); *G06F 1/1683* (2013.01); *Y10T 29/49002* (2015.01)

(56) References Cited

U.S. PATENT DOCUMENTS

| | | | |
|---|---|---|---|
| 6,922,333 B2 | 7/2005 | Weng et al. | |
| 7,762,817 B2* | 7/2010 | Ligtenberg | H01R 13/74 439/38 |
| 7,835,150 B2* | 11/2010 | Degner | G06F 1/1616 361/679.58 |
| 2004/0096053 A1* | 5/2004 | Francke | G06F 1/1616 379/428.04 |
| 2005/0168923 A1* | 8/2005 | Huang | G06F 1/162 361/679.59 |
| 2006/0056140 A1* | 3/2006 | Lev | E05C 19/163 361/679.27 |
| 2006/0067038 A1 | 3/2006 | Lev et al. | |
| 2007/0133156 A1* | 6/2007 | Ligtenberg | G06F 1/1616 361/679.27 |
| 2008/0179895 A1* | 7/2008 | Lin | E05B 47/004 292/116 |
| 2008/0278269 A1* | 11/2008 | Ramirez | E05C 19/16 335/205 |
| 2009/0147471 A1* | 6/2009 | Francisco | G06F 1/1624 361/679.56 |
| 2009/0244009 A1* | 10/2009 | Staats | G06F 1/162 345/168 |
| 2010/0053857 A1* | 3/2010 | Zhu | E05B 15/101 361/679.01 |
| 2010/0058557 A1* | 3/2010 | Wang | G06F 1/1616 16/320 |
| 2010/0071157 A1* | 3/2010 | Wang | G06F 1/1616 16/297 |
| 2010/0176698 A1* | 7/2010 | Wu | G06F 1/1616 312/223.1 |
| 2010/0246119 A1 | 9/2010 | Collopy et al. | |
| 2010/0271771 A1 | 10/2010 | Wu et al. | |
| 2010/0283270 A1* | 11/2010 | Hood, III | E05B 17/0033 292/251.5 |
| 2010/0302179 A1* | 12/2010 | Ahn | G06F 1/1618 345/173 |
| 2011/0134600 A1 | 6/2011 | Pine | |
| 2011/0194239 A1* | 8/2011 | Yang | E05B 73/0082 361/679.26 |
| 2012/0106065 A1* | 5/2012 | Yu | E05B 15/022 361/679.27 |

FOREIGN PATENT DOCUMENTS

| | | |
|---|---|---|
| CN | 102156510 | 8/2011 |
| JP | 2002-215265 | 7/2002 |
| JP | 2004-047367 | 2/2004 |
| JP | 2008-235073 | 10/2008 |
| JP | 2010-277592 | 12/2010 |
| JP | 2011-008608 | 1/2011 |
| TW | 200419429 A | 10/2004 |
| TW | 306675 U | 2/2007 |

* cited by examiner

COMPUTING SYSTEM INCLUDING A FIRST AND SECOND HOUSING AND POLAR MAGNETS

CROSS-REFERENCE TO RELATED APPLICATION

This application is a national stage application under 35 U.S.C. §371 of PCT/US2012/026714, filed Feb. 27, 2012, which claims the benefit under 35 U.S.C. §119(e) of U.S. Provisional Application No. 61/566,841, filed Dec. 5, 2011.

BACKGROUND

Portable computing systems come in different sizes, shapes and features. Some portable computers are in a tablet configuration with a display as the only input system. Other portable computers are notebook configurations with a keyboard housing and a display housing connected by a hinge.

BRIEF DESCRIPTION OF THE DRAWINGS

Some embodiments of the invention are described with respect to the following figures.

DETAILED DESCRIPTION

A portable computing device that could have a display housing that was removable from the base housing and could be used as a tablet can allow a consumer to have the benefits of a tablet computer and a notebook computer without purchasing both a tablet computer and a notebook computer.

To removably connect a tablet computer to a base that can be separated uses a fastener such as a latch. Latches can be mechanical devices where a mechanical lever between two housings causes the latch to move from a first position when the housings are not connected to a second position when the housings are connected. The mechanical lever requires a force to push the two housing together and cause the lever to move the latch to the latched position. If the force applied was not great enough the two housing may not connect properly allowing the housing to separate without the latch being intentionally disengaged. If the two housings could latch without applying force to the housings when connecting them can insure that the housings are latched.

A magnet has poles at opposite sides of the magnets. One pole of a magnet will try to attract to the opposite pole of another magnet while repelling the like pole of the other magnet. The opposite poles are referred to an S and N. A magnet that is referred to an S-magnet means that the S-pole or S-side of the magnet is facing the outside of the computing system while the N-pole of the magnet is facing inside the computing system. A magnet that is referred to a N-magnet means that the N-pole or N-side of the magnet is facing the outside of the computing system while the S-pole of the magnet is facing inside the computing system. The magnets may be for example ceramic, ferrite, rare-earth or another type of magnet.

In one implementation, a computing system can include a first housing with a polar magnet on a first side. The first housing can include an opening on the first side. A second housing can include a sliding latch. An opposite polar magnet attached to the sliding latch. An alignment mechanism can align the opening with a latch hook in an unlatched position. The polar magnet attracts the opposite polar magnet on the sliding latch to move the sliding latch to a latched position.

Figure 1:
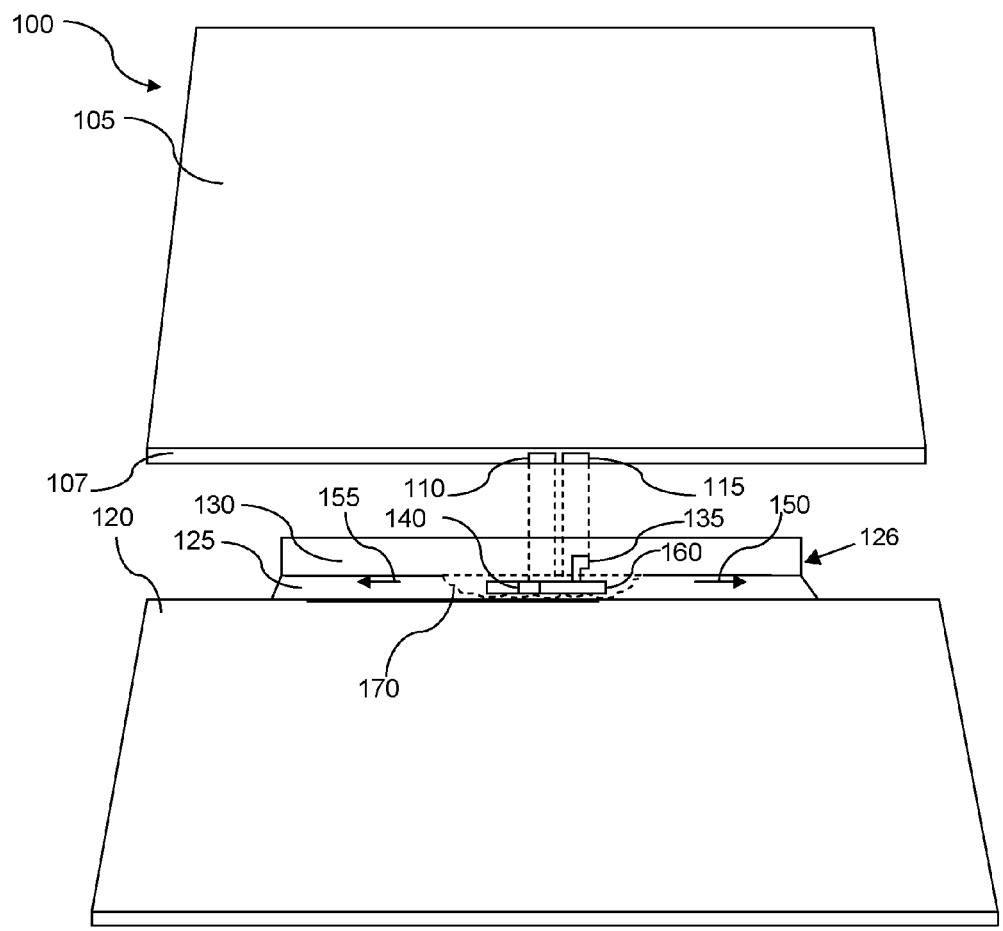
FIG. 1 is a computing system with a latch according to an example implementation.

With reference to the figures, FIG. 1 is a computing system with a latch according to an example implementation. A computing system 100 can include a first housing 105 with a polar magnet 110 on a first side 107. The first housing 105 can include an opening 115 on the first side 107. A second housing 120 can include a sliding latch 160 between the back side 130 of the receiver 126 and the front side 125 of the receiver 126. The receiver 126 is where the first housing 105 is received by the second housing 120. A cut away of the front side 125 of the receiver is represented by the dotted lines 170 surrounding the sliding latch 160 so that the sliding latch is visible in the figure since a portion of the sliding latch is internal to the second housing and only the latch hook is usually visible. An opposite polar magnet 140 can be attached to the sliding latch 160. An alignment mechanism can align the opening 115 with the latch hook 135 in an unlatched position. The polar magnet 110 attracts the opposite polar magnet 140 on the sliding latch 160 to move the sliding latch 160 to a latched position. The dotted lines extending between the first housing 105 and the second housing 140 show that in the unlatched state the opening 115 and the latch hook are aligned but the polar magnet 110 is not aligned with opposite polar magnet 140. In one implementation the polar magnet is an S-magnet and the opposite polar magnet is an N-magnet but they can also be reversed. The housing and the latch may be made out of a non-magnet material such as plastic, aluminum or another material. If the first housing 105 is separated from the second housing the sliding latch moves in the first direction 155. If the first housing 105 is connected to the second housing 120 the sliding latch moves in the second direction 150. In another example implementation the sliding latch may be implemented on a notebook where the first housing is connected to the second housing by a hinge and the latch is used to keep the notebook in a closed state and prevent the first housing from pivoting away from the second housing to an open state. In another implementation the sliding latch may be used to connect a computing system to ports connectors, docking stations or other devices.

Figure 2:
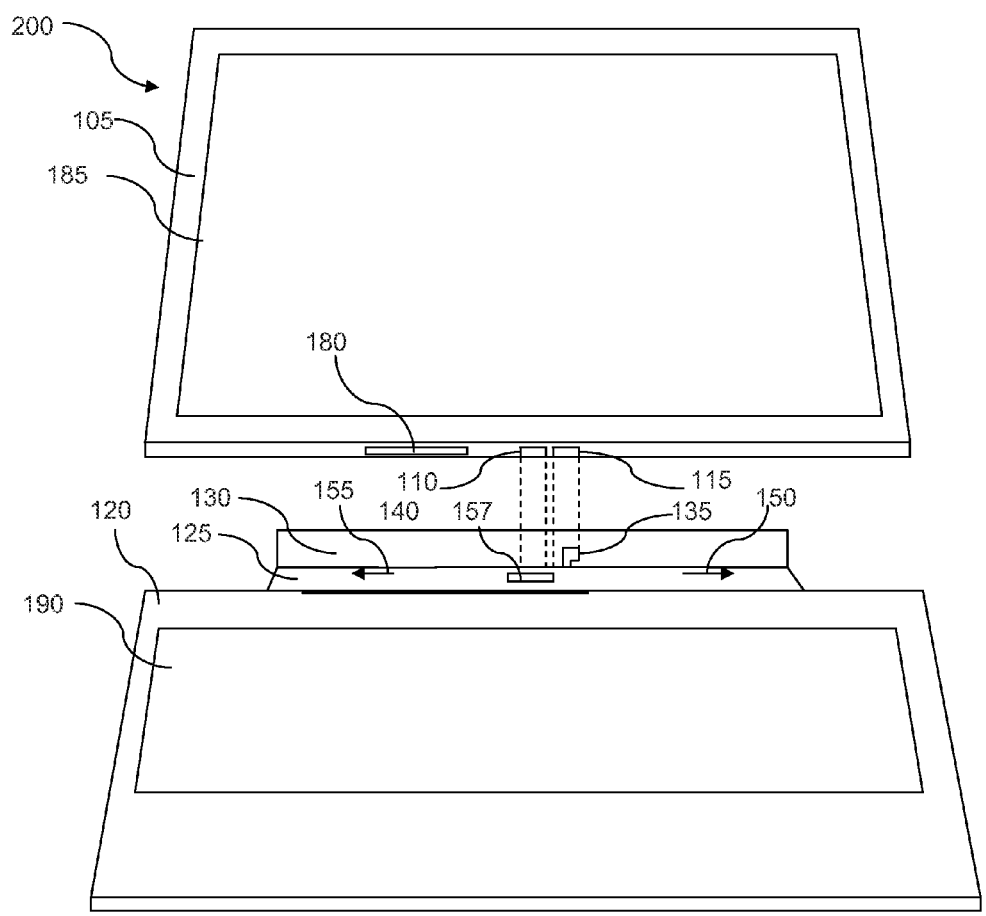
FIG. 2 is a computing system with a latch according to an example implementation.

FIG. 2 is a computing system with a latch according to an example implementation. A computing system 200 can include a first housing 105 with a polar magnet 110 on a first side 107. The first housing 105 can include an opening 115 on the first side 107. A second housing 120 can include a sliding latch 160 between the back side 130 of the receiver and the front side 125 of the receiver. In one embodiment the user can apply the additional force to the sliding latch 460 through a sliding button 157 on the front 125 of the receiver to overcome the force of the magnets to separate the first housing 105 and the second housing 120. The receiver is where the first housing 105 is received by the second housing 120. An opposite polar magnet 140 can be attached to the sliding latch 160 shown in FIG. 1. An alignment mechanism can align the opening 115 with the latch hook 135 in an unlatched position. The polar magnet 110 attracts the opposite polar magnet 140 on the sliding latch 160 to move the sliding latch 160 to a latched position.

A display 185 can be included in the first housing 105. The display can be a liquid crystal display (LCD), an organic light emitting diode display (OLED) or another type of display. The display can be a capacitive or resistive touch input display or another type of touch input display. An input device 190 can be in the second housing 120. The input device may be a keyboard, a trackpad, a touch display or another input device. A data interface 180 can be between components in the first housing 105 and components in the second housing 120. When the first housing is a tablet when separated from the second housing the components in the first housing may include a processor, memory, a transceiver, a battery or other components. The components in the second housing 120 may include a battery, computer readable storage such as a hard disk drive or solid state drive. The data interface 180 can be a wired such as a universal serial bus connection or may be wireless such as a Bluetooth connection.

Figure 3:
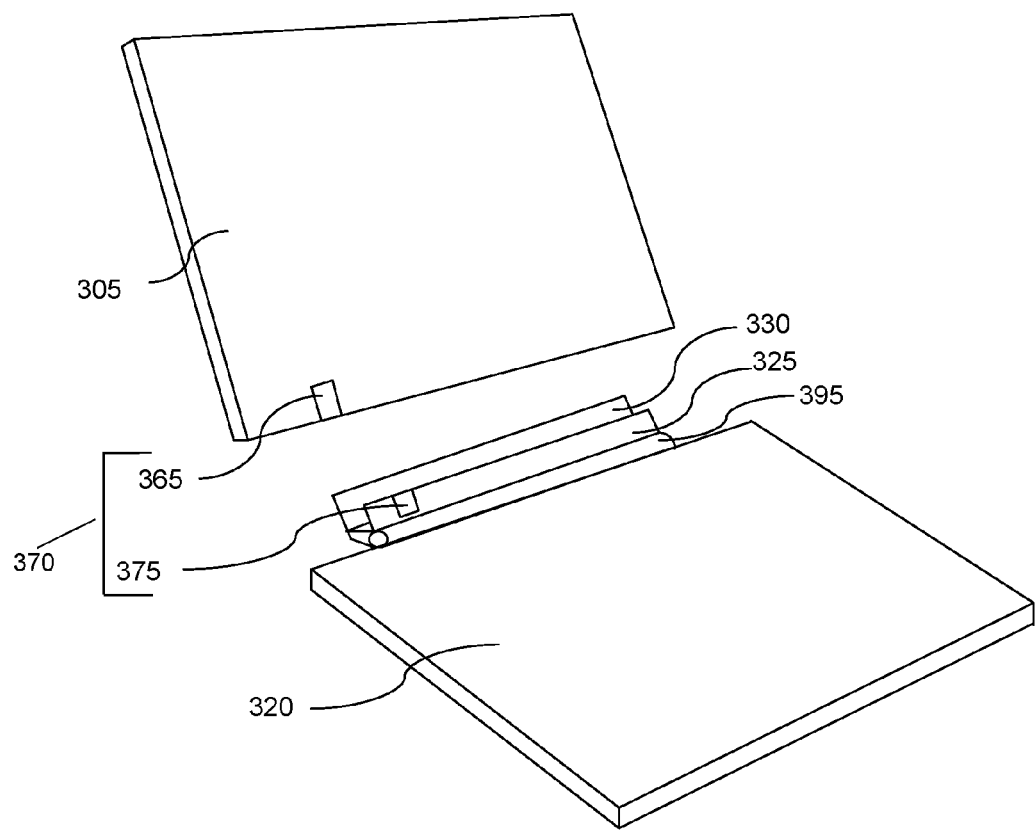
FIG. 3 is a computing system with an alignment magnet according to an example implementation.

FIG. 3 is a computing system with an alignment magnet according to an example implementation. The first housing 305 has to align with the second housing 320 to connect the housings together. The alignment mechanism 370 can be a alignment polar magnet 365 on the first housing 305 and an opposite polar alignment magnet 375 on the second housing 320. The alignment polar magnet 365 and the opposite polar alignment magnet 375 may be on the front of the first housing 305 and the front 325 of the receiver or may be in the back of the first housing 305 and the back 330 of the receiver. The alignment polar magnet 365 may also be on the first side of the first housing 305 and the opposite polar alignment magnet 375 may be between the front 325 and the back 330 of the receiver. When the alignment polar magnet is for example an S-magnet and the opposite polar alignment magnet is a N-magnet they will be attracted to each other aligning the first housing 105 with the second housing 320. In one embodiment the receiver including the front 325 and the back 330 can be connected via a hinge 395 allowing the first housing 305 and the second housing 320 to pivot relative to each other. The hinge 395 may support the sliding latch in the receiver.

Figure 4A:
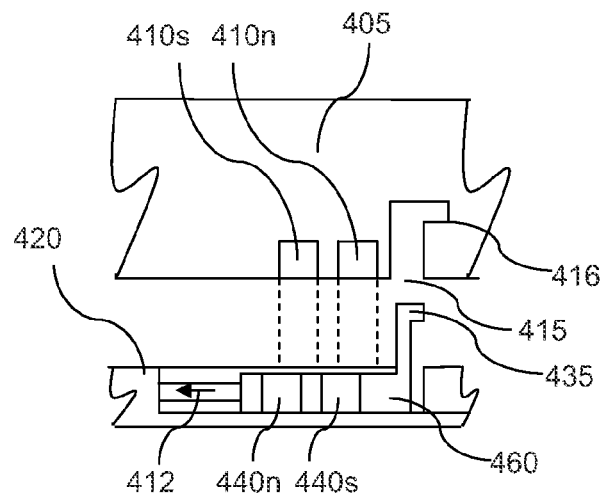
FIG. 4A-C is a portion of a computing system latch according to an example implementation.
Figure 4B:
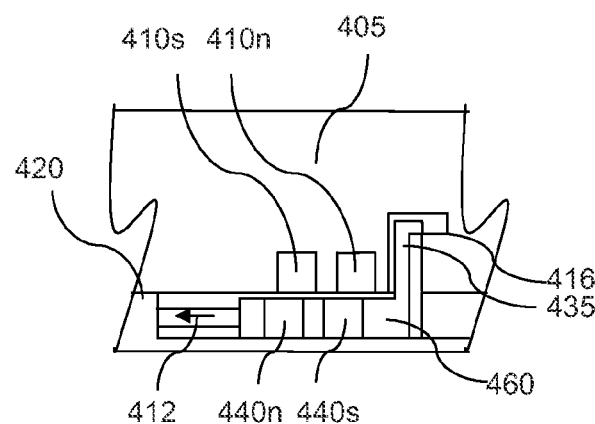
Figure 4C:
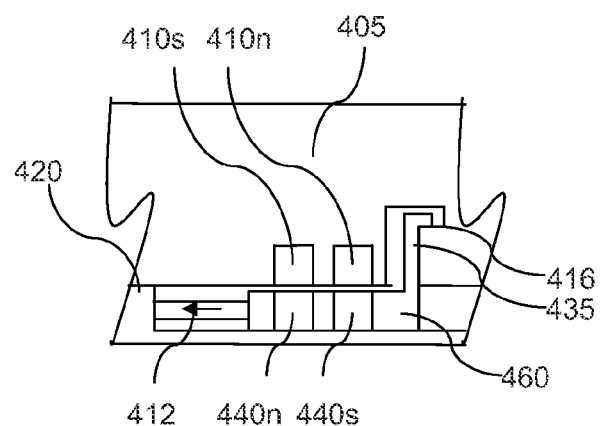

FIG. 4A-C is a portion of a computing system latch according to an example implementation. The first housing 405 can include a polar magnet 410s and a polar magnet 410n. The polar magnet 410s can be an S-magnet and the polar magnet 410n can be an N-magnet for explanation. The first housing 405 can include an opening 415 that extends to a latching shelf 416. The second housing 420 can include a sliding latch 460 that is attached to the latch hook 435. The sliding latch 460 is attached to a biasing mechanism 412. The biasing is in the direction of the arrow in the biasing mechanism 412. A biasing mechanism 412 can bias the sliding latch 460 against the force of the magnets 410s, 410n, 440s, 440n. The biasing mechanism 412 can be a spring. The biasing mechanism may be a magnet that provides less force than the Magnets 410n, 410s, 440n and 440s. For example the biasing mechanism may provide 1 newton of force on the sliding latch 460 in the direction of the arrow while the magnets 410n, 410s, 440n, and 440s may provide 2 newtons of force on the sliding latch when the first housing 405 is connected to the second housing 420. The sliding latch 460 can include an opposite polar magnet 440n and an opposite polar magnet 440s.

In FIG. 4A the first housing 405 is separated from the second housing 420 and biasing mechanism 412 is pulling the sliding latch in the direction of the arrow. In FIG. 4B the first housing 405 is connected to the second housing 420 but the magnets 410s and 410n have not pulled the magnets 440n and 440s, the sliding latch 460 and the latch hook 435 in the opposite direction of the biasing arrow. In FIG. 4C the first housing 405 is latched to the second housing 420 because the magnets 410n and 410s have attracted the magnets 440n and 440s with enough force to overcome the bias of the biasing mechanism 412 causing the latch hook to engage the latching shelf. While 2 pairs of magnets are shown for explanation, more pairs or less pairs of magnets may be used.

To release the first housing 405 from the second housing 420 a force can be applied to the sliding latch 460 in the direction of the arrow to assist the biasing mechanism 412 in overcoming the force of the magnets 410s, 410n, 440n, and 440s. In one embodiment the user can apply the additional force to the sliding latch 460 through a sliding button 157 on the front 125 of the receiver in FIG. 2. If force is applied to the sliding latch 460 in the direction of the arrow the magnets 410s, 410n, 440s, and 440n at a level to overcome the force of attraction of the magnets 410s, 410n. 440s, and 440n the magnets will become unaligned as show in FIG. 4A and the magnets 410s and 440s will repel each other separating the first housing 405 from the second housing 420.

Figure 5:
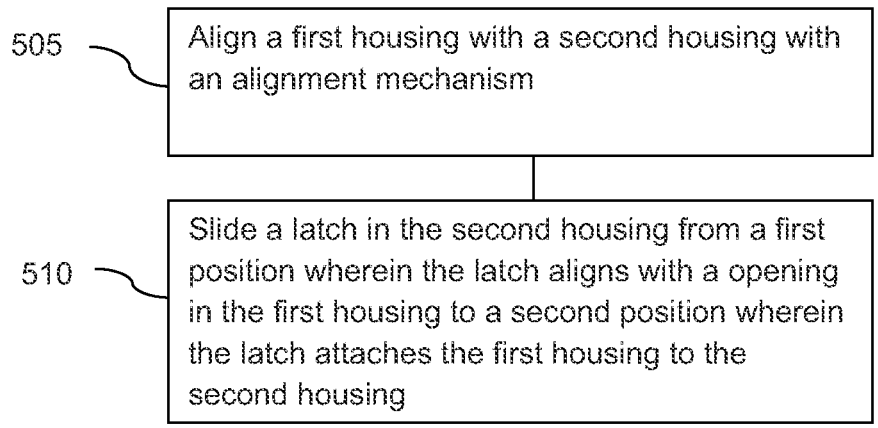
FIG. 5 is a flow chart of a method of latching a display component of a computing system to a base of a computing system according to an example implementation.

FIG. 5 is a flow chart of a method of latching a display component of a computing system to a base of a computing system according to an example implementation. The method of latching a display component of a computing system to a base can include aligning a first housing with a second housing with an alignment mechanism at 505. The alignment mechanism may be a magnet or the alignment mechanism may be a post in either the first or the second housing with an opening to receive the post in the other of the first or the second housing. A latch can slide in the second housing from a first position wherein the latch aligns with an opening in the first housing to a second position wherein the latch attaches the first housing to the second housing at 510 to latch the first housing to the second housing.

Figure 6:
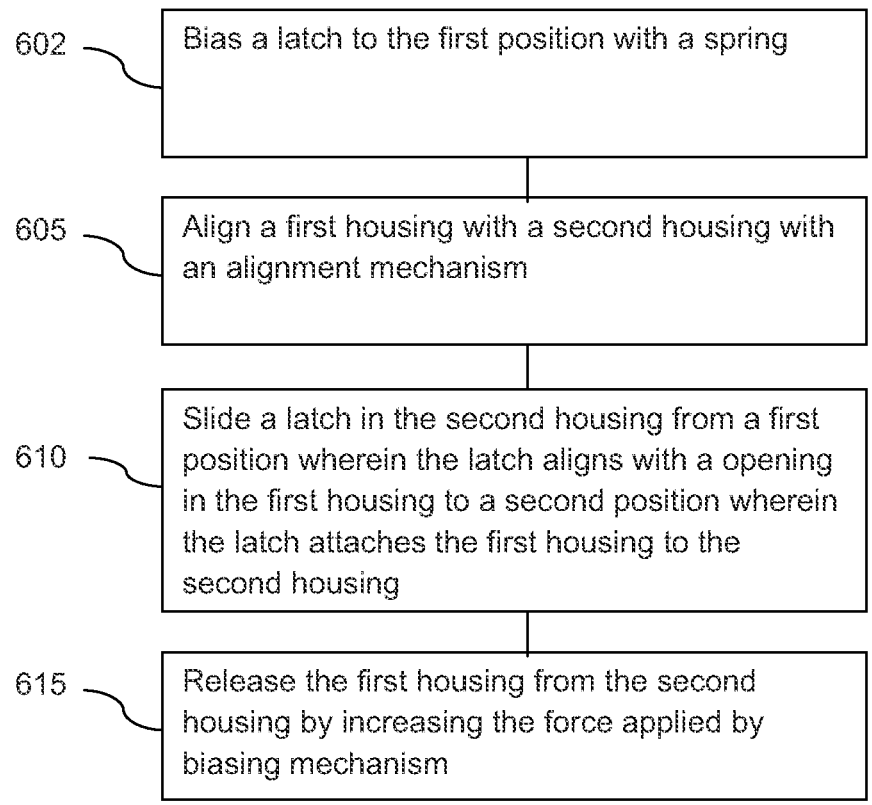
FIG. 6 is a flow chart of a method of latching a display component of a computing system to a base of a computing system according to an example implementation.

FIG. 6 is a flow chart of a method of latching a display component of a computing system to a base of a computing system according to an example implementation. The method of latching a display component of a computing system to a base can include a latch that can be bias to the first position with a spring at 602. A first housing can be aligned with a second housing with an alignment mechanism at 605. The alignment mechanism may be a magnet or the alignment mechanism may be a post in either the first or the second housing with an opening to receive the post in the other of the first or the second housing. A latch can slide in the second housing from a first position wherein the latch aligns with an opening in the first housing to a second position wherein the latch attaches the first housing to the second housing at 610 to latch the first housing to the second housing. To release the first housing from the second housing the force applied by biasing mechanism can be increased to overcome the force of the magnets at 615.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing system comprising:
a first housing with a polar magnet on a first side;
an opening on the first side;
a second housing with a sliding latch comprising a latch hook;
an opposite polar magnet attached to the sliding latch;
an alignment mechanism to align the opening with the latch hook when the latch hook is in an unlatched position, wherein the latch hook enters into the opening along a first direction when the first housing is moved into engagement with the second housing, wherein the polar magnet attracts the opposite polar magnet attached to the sliding latch to provide an attractive sliding force that causes sliding, along a second direction that is perpendicular to the first direction and that is parallel to an edge of the second housing, the latch hook from the unlatched position where the latch hook is disengaged from a receptacle, to a latched position where the latch hook is engaged into the receptacle.

2. The computing system of claim 1, further comprising a biasing mechanism to bias the sliding latch, in a direction opposite the second direction, against the attractive sliding force of the polar magnet and the opposite polar magnet, wherein the attractive sliding force of the polar magnet and the opposite polar magnet overcomes a biasing force of the biasing mechanism to slide the latch hook in the second direction from the unlatched position to the latched position.

3. The computing system of claim 1, wherein the alignment mechanism comprises a second polar magnet on the first housing and a second opposite polar magnet on the second housing.

4. The computing system of claim 2, wherein the biasing mechanism comprises a spring.

5. The computing system of claim 1, further comprising a display in the first housing, and an input device in the second housing.

6. The computing system of claim 1, wherein the second housing further comprises a hinge supporting the sliding latch.

7. The computing system of claim 1, further comprising a data interface between components in the first housing and components in the second housing.

8. A method of latching a display component of a computing system to a base, comprising:
aligning, with an alignment mechanism, an opening in a first housing with a latch hook of a latch of a second housing when the latch hook is in an unlatched position;
moving the latch hook into the opening along a first direction when the first housing is moved into engagement with the second housing; and
sliding, along a second direction that is perpendicular to the first direction and that is parallel to an edge of the second housing, the latch hook from the unlatched position where the latch hook is disengaged from a receptacle, to a latched position where the latch hook is engaged into the receptacle, the sliding of the latch hook from the unlatched position to the latched position caused by an attractive sliding force between a first magnet attached to the first housing and a second magnet attached to the latch, the attractive sliding force moving the latch hook in the second direction from the unlatched position to the latched position.

9. The method of claim 8, further comprising biasing, with a biasing mechanism, the latch, in a direction opposite the second direction, to a position corresponding to the unlatched position of the latch hook, wherein the attractive sliding force of the first and second magnets overcomes a biasing force of the biasing mechanism when sliding the latch hook in the second direction from the unlatched position to the latched position.

10. The method of claim 9, further comprising releasing the first housing from the second housing by applying a force that in combination with the biasing force applied by the biasing mechanism causes the releasing.

11. The computing system of claim 1, wherein the receptacle extends from the opening inside the first housing, the receptacle angled with respect to the opening, and the opening and the receptacle forming generally an L shape to match an L shaped portion of the latch hook, the sliding of the latch hook comprising sliding the L-shaped portion of the latch hook along the second direction that is parallel to the edge of the second housing.

12. The computing system of claim 2, wherein the biasing mechanism comprises a magnet that applies less biasing force than the attractive sliding force of the polar magnet and the opposite polar magnet.

13. The computing system of claim 1, wherein the sliding of the latch hook is in the second direction that is generally perpendicular to an axis along which the first and second housings are brought together for connection.

14. The method of claim 9, wherein the biasing mechanism comprises a magnet.

15. The method of claim 8, wherein the alignment mechanism comprises a third magnet attached to the first housing and a fourth magnet attached to the second housing.

16. An apparatus to connect a first housing to a second housing, comprising:
a sliding latch for attachment to the second housing and comprising a latch hook;
an alignment mechanism comprising a magnet to align the latch hook with an opening of the first housing when the latch hook is in an unlatched position, wherein the latch hook is to enter into the opening along a first direction when the first housing is moved into engagement with the second housing;
a first magnet for attachment to the first housing; and
a second magnet attached to the sliding latch, the first and second magnets providing an attractive sliding force to cause sliding movement of the latch hook relative to the first housing from the unlatched position where the latch hook is disengaged from a receptacle, to a latched position where the latch hook is engaged into the receptacle, the sliding movement of the latch hook being along a second direction that is perpendicular to the first direction and that is parallel to an edge of the second housing, the attractive sliding force to move the latch hook in the second direction from the unlatched position to the latched position.

17. The method of claim 8, wherein the sliding of the latch hook is in the second direction that is generally perpendicular to an axis along which the first and second housings are brought together for connection.

18. The method of claim 8, wherein the receptacle extends from the opening inside the first housing, the receptacle angled with respect to the opening, and the opening and the receptacle forming generally an L shape to match an L shaped portion of the latch hook, the sliding of the latch hook comprising sliding the L-shaped portion of the latch hook along the second direction that is parallel to the edge of the second housing.

19. The computing system of claim 1, wherein the edge of the second housing contacts the first housing when the first housing is engaged to the second housing and the latch hook has entered the opening.

20. The apparatus of claim 16, further comprising:
a spring to bias the sliding latch, in a direction opposite the second direction, to the unlatched position, wherein the attractive sliding force of the first and second magnets overcomes a biasing force of the spring when sliding the latch hook in the second direction from the unlatched position to the latched position.

\* \* \* \* \*